Feb. 11, 1947.　　　J. R. DORMAN　　　2,415,472
TUBE AND COUPLING ASSEMBLY
Filed Aug. 19, 1943
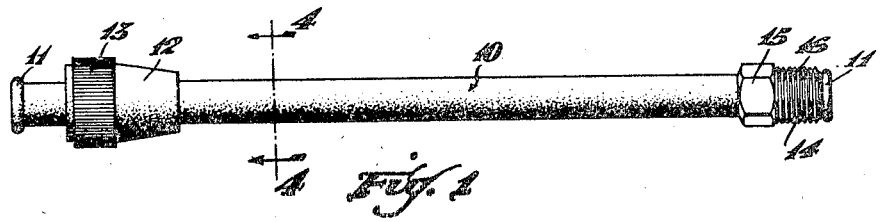
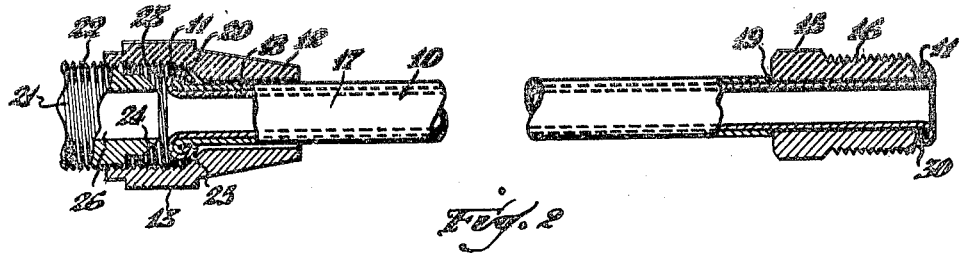
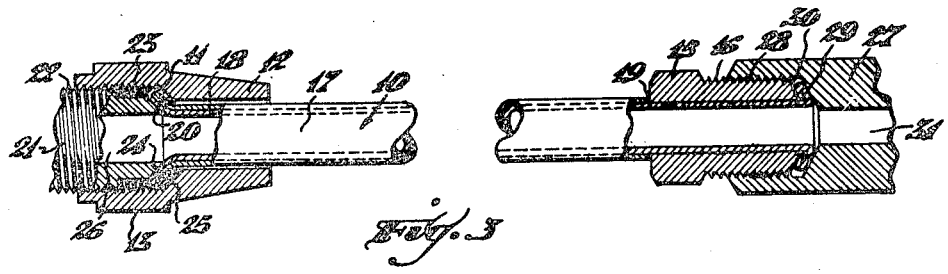
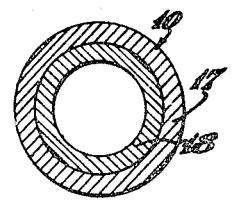
INVENTOR.
Jack R. Dorman
BY Wood, Arey, Herron & Evans
Attorneys.

Patented Feb. 11, 1947

2,415,472

UNITED STATES PATENT OFFICE 2,415,472

TUBE AND COUPLING ASSEMBLY

Jack R. Dorman, Cincinnati, Ohio

Application August 19, 1943, Serial No. 499,236

3 Claims. (Cl. 285—2)

This invention relates to the assembly of tubing with coupling members for forming a line for the transmission of fluids such as, for example, a fuel line in an automobile or other motor vehicle. The invention is particularly concerned with a tubing of unique construction, the provision of coupling elements particularly adapted to engage with this tubing and the combined assembly of the tubing and coupling elements.

In my earlier United States Patent No. 2,326,292, of August 10, 1943, I have disclosed and claimed a tubing formed from resilient plastic material and having its end edges turned rearwardly to constitute a collapsible cuff, this cuff being adapted to engage with various types of coupling elements, as disclosed in my copending application Serial No. 463,785, filed October 29, 1942. The present invention is directed to a modification, or improvement, in the construction of the tubing as disclosed in my aforesaid United States Letters Patent. In addition, the assembly of this tubing with the coupling elements constitutes a completely novel combination having certain specific advantages over other such assemblies of the prior art.

Tubing constructed from various types of resilient and flexible plastic material is inherently possessed of a number of desirable characteristics which adapt it for use in lines for the transmission of fluid, particularly automobile fuel lines. The material is highly resistant to chemical action, is bendable and pliable, and, because of its compressible nature, can be readily utilized with a coupling element to form a tight seal at the joints. As a replacement for metal tubing, it possesses the greater part of the virtues of this type of tubing and, in addition, has certain particular advantages of its own such as, for example, lightness of weight, flexibility, and cheapness when manufactured in large quantities.

In certain uses, however, plastic tubing may be subject to particular strains which it is not adapted to resist as effectively as tubing formed from metal. For example, where the tubing is subject to a continuous flexing at or around the same area, it may, under certain rather extreme conditions, pin-hole and crack. To meet this objection, in the present invention I have provided tubing which comprises an inner and outer layer of plastic material somewhat similarly configurated at the ends, the material being either the same or different in each lamination depending on its use. This double-layered, or laminated, tubing has certain additional advantages beyond that of possessing increased strength. It lends itself more readily to the formation of a seal in combination with certain types of coupling elements and also provides a means for securely positioning coupling elements on the tubing so that they will not be slidable along the length thereof.

For particular uses it may be advisable to have the laminations formed from somewhat different materials. For example, the inner lamination may be formed from a plastic material having physical chemical characteristics which render it impervious to the action of particular chemicals, and the outer lamination may be formed from a material which is particularly resistant to high and low temperatures.

From this general description of the broad objective of the invention, the specific objectives have been to provide a double-layered, or laminated, tubing formed from a flexible plastic material, both to increase the strength of the tubing at the points where flexing is likely to occur and to provide a means for positioning coupling elements in fixed positions on the tubing.

Another object has been to provide a tubing of the character described in which, due to the configuration of the ends of the laminated tubes, an improved sealing is obtained.

Another object has been the provision of a tubing and coupling assembly in which units of the assembly are somewhat easier to handle than units in which the coupling elements are entirely separate from the tubing or are slidable thereon.

Another object has been the provision of a laminated tubing in which each lamination of the tubing has specialized characteristics adapted for a particular use.

Other and further objects and advantages will be apparent from the further and more detailed description of the invention when considered in conjunction with the drawing which discloses a preferred embodiment of the invention.

In the drawing:

Figure 1 is a side elevation of a tube of the type of the invention with coupling elements disposed at each end thereof.

Figure 2 is a similar view somewhat enlarged and with the coupling elements and certain portions of the tubing broken away better to illustrate the invention. This view also shows on the left a male coupling element about to engage with a corresponding female element to form, with the tubing, a fluid tight seal.

Figure 3 is a view similar to Figure 2, showing the left-hand coupling elements fully engaged and the right-hand element screw-threaded into a corresponding mating element, a bore in this mating element coinciding with the hollow interior of the tube to form a continuous passageway.

Figure 4 is a sectional view along the line 4—4, Figure 1.

In Figure 1 the laminated tube is indicated generally at 10. The ends of the inner lamination have been turned rearwardly to form peripheral cuffs 11, the cuff on the left completely enclosing a similar cuff on the outer lamination. The left-hand coupling element, designated as 12, includes on its outer surface a finger-hold portion 13. The right-hand coupling element, designated 14, includes a nut portion 15 and a screw-threaded portion 16. As will be noted in Figures 2 and 3, the right-hand coupling element extends around the inner section of the tubing only.

The details of the interior construction of the coupling elements and the cuffs formed on the ends of the tubing are best illustrated in Figure 2. In this figure, 17 designates the outer lamination of the tubing and 18, the inner lamination. One end of the outer lamination, in this case the right end, abuts against an end of the right-hand coupling element as at 19, thereby securely positioning this coupling element between the end of the outer lamination and the cuff formed on this end of the inner lamination. At its other end, the outer lamination has its edge turned rearwardly, forming the cuff 20, which, as previously stated, is positioned interior of the cuff 11 formed on the corresponding end of the inner lamination. Both of these cuffs are simply turned-back portions, and it is not essential that any part of either of them directly contact the body of the outer lamination of the tubing, although they will do so, preferably, when in sealed engagement with the coupling elements, as shown in Figure 3.

As shown in Figure 2, a male coupling element 21 having a screw-threaded end 22 may be inserted in the left-hand coupling element 12, the screw threads engaging with threads 23 on the inner surface of the element 12. The end of the male coupling element may be beveled peripherally as at 24, this beveled edge being adapted to cooperate with the inclined surface 25 on the interior of the female element and to compress both tubing cuffs into a sealed engagement in the manner illustrated in Figure 3. The male coupling element has a bore 26 formed centrally therein, this bore being adapted to form, with the tubing, a continuous passageway through the tubing and coupling element 21.

As shown in Figure 3, the right-hand coupling element is likewise adapted to engage with a mating element 27 having interior screw threads 28. This mating element has a substantially vertical peripheral inner surface 29 which cooperates with the correspondingly configured surface 30 on the male element 14 in sealing the coupling elements by pressure exerted on the cuff 11 disposed between the surfaces 29 and 30, as illustrated in Figure 3. When the seal is completed, a continuous passageway will be formed through the bore 31 in the coupling element 27 and the tubing.

The cuffs are highly compressible, due both to the fact that they are spaced from the main body of the tubing and because of the inherent compressibility of the material from which they are formed. Accordingly, in the case of the left-hand coupling, the cuffs are first compressed against the outer lamination of the tubing and then, as pressure is increased, the material from which they are formed is slightly compressed also. This compressibility is accentuated by the double cuff arrangement. In the right-hand coupling a slightly different action takes place. As the elements engage, the cuff is bent to a position substantially vertical with respect to the tubing and is then compressed on itself. The result is somewhat the same as if a separate compressible gasket were interposed between the coupling elements.

It will be noted that in the case of the left-hand coupling, particularly, a large amount of compression is possible and, accordingly, a very tight and secure seal can be obtained. Although the arrangement of the elements is somewhat different in the case of the right-hand coupling, an effective result can be obtained in this type of coupling also. In the preferred embodiment of the combination shown, the tubing is of double thickness at all points at which flexing is apt to occur and the resultant structure is, accordingly, considerably stronger than if only a single thickness were provided. The secure disposition of the right-hand coupling element at the end of the assembly considerably facilitates the handling of the assembly and the setting-up or tearing-down of the fuel line.

Having fully described my invention, I claim:

1. In combination, a tube and a pair of coupling members positioned one at each end thereof, said tube comprising an inner section comprising a length of resilient and flexible plastic tubing having its end edges turned rearwardly to form peripheral cuffs and an outer section formed from similar material and having one edge only turned rearwardly to form a similar cuff, said outer section cuff being disposed interiorly of the corresponding cuff on the inner section and being spaced from the wall of the outer tube to provide an annular space therebetween, one of the coupling elements being position on the inner section of the tube and being maintained in fixed position between a peripheral cuff on the inner section and the end edge of the outer section.

2. In a tube and coupling combination, a laminated tube comprising an inner section of tubing formed from resilient and flexible plastic material having its end edges turned rearwardly to form a peripheral cuff at each end thereof and an outer section formed from similar material and having one end edge turned rearwardly to form a similar cuff, said outer section cuff being disposed interiorly of the corresponding cuff on the inner section and being slightly spaced from the wall of the outer tube, said outer section being shorter than the inner section to provide a space at an end of the inner section for the positioning of a coupling element between the cuff on the inner section and the end edge of the outer section.

3. In a tube and coupling combination for fuel lines or the like, a tube comprising an inner section of resilient plastic material having an end edge turned rearwardly to form an external peripheral cuff, said cuff normally being spaced slightly from the wall of the tube and an outer section of similar material having an end edge turned rearwardly to form a similar cuff, said outer section cuff and being likewise spaced from the wall of the outer tube being disposed interior of the inner section cuff, said cuffs being collapsible upon compression between the surfaces of engaging coupling elements to form a seal between the tube and the coupling elements.

JACK R. DORMAN.

REFERENCES CITED

The following references are of record in the file of this patent:

UNITED STATES PATENTS

| Number | Name | Date |
| --- | --- | --- |
| 1,987,100 | Dick | Jan. 8, 1935 |
| 1,847,218 | Lamb | Mar. 1, 1932 |
| 2,298,117 | Franck | Oct. 6, 1942 |
| 1,794,955 | Gordon | Mar. 3, 1931 |

FOREIGN PATENTS

| Number | Country | Date |
| --- | --- | --- |
| 748,904 | French | Apr. 25, 1933 |